(12) United States Patent
Ducos et al.

(10) Patent No.: US 8,800,920 B2
(45) Date of Patent: Aug. 12, 2014

(54) AIRCRAFT LANDING GEAR OF THE ROCKER-ARM AND DEFORMABLE-PARALLELOGRAM TYPE

(75) Inventors: Dominique Ducos, Savigny sur Orge (FR); Jean-François Locufier, Rambouillet (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 60 days.

(21) Appl. No.: 13/522,782

(22) PCT Filed: Jan. 19, 2011

(86) PCT No.: PCT/EP2011/000198
§ 371 (c)(1),
(2), (4) Date: Oct. 5, 2012

(87) PCT Pub. No.: WO2011/088991
PCT Pub. Date: Jul. 28, 2011

(65) Prior Publication Data
US 2013/0020436 A1 Jan. 24, 2013

(30) Foreign Application Priority Data
Jan. 19, 2010 (FR) ...................................... 10 50325

(51) Int. Cl.
*B64C 25/10* (2006.01)
(52) U.S. Cl.
USPC .................................. 244/102 A; 244/103 R

(58) Field of Classification Search
USPC ................. 244/102 A, 102 R, 103 R, 102 SS
See application file for complete search history.

(56) References Cited

U.S. PATENT DOCUMENTS

| | | | | |
|---|---|---|---|---|
| 3,261,574 A | * | 7/1966 | Bowdy | 244/102 R |
| 3,580,531 A | * | 5/1971 | Bock et al. | 244/102 R |
| 4,412,665 A | | 11/1983 | Kramer et al. | |
| 2002/0056786 A1 | * | 5/2002 | Grossman | 244/102 R |

FOREIGN PATENT DOCUMENTS

| | | |
|---|---|---|
| FR | 1 212 484 A | 3/1960 |
| GB | 1141142 A | 1/1969 |

OTHER PUBLICATIONS

International Search Report of PCT/EP2011/000198 dated Apr. 11, 2011.

* cited by examiner

*Primary Examiner* — Philip J Bonzell
(74) *Attorney, Agent, or Firm* — Sughrue Mion, PLLC

(57) ABSTRACT

The invention relates to an aircraft landing gear of deformable-parallelogram type, including:
  a leg including a casing (1) having a lower end on which a rocker arm (3) carrying at least one wheel is hinged by means of a pivot (2), a shock absorber (5) being connected between the rocker arm and the casing;
  two panels (10, 11) each hinged on the one hand on the structure of the aircraft and on the other hand on the leg, about parallel axes;
According to the invention, one of the panels (11) is hinged on the leg while being connected to the casing by a pin on one end of the pivot (2) of the rocker arm.

3 Claims, 2 Drawing Sheets

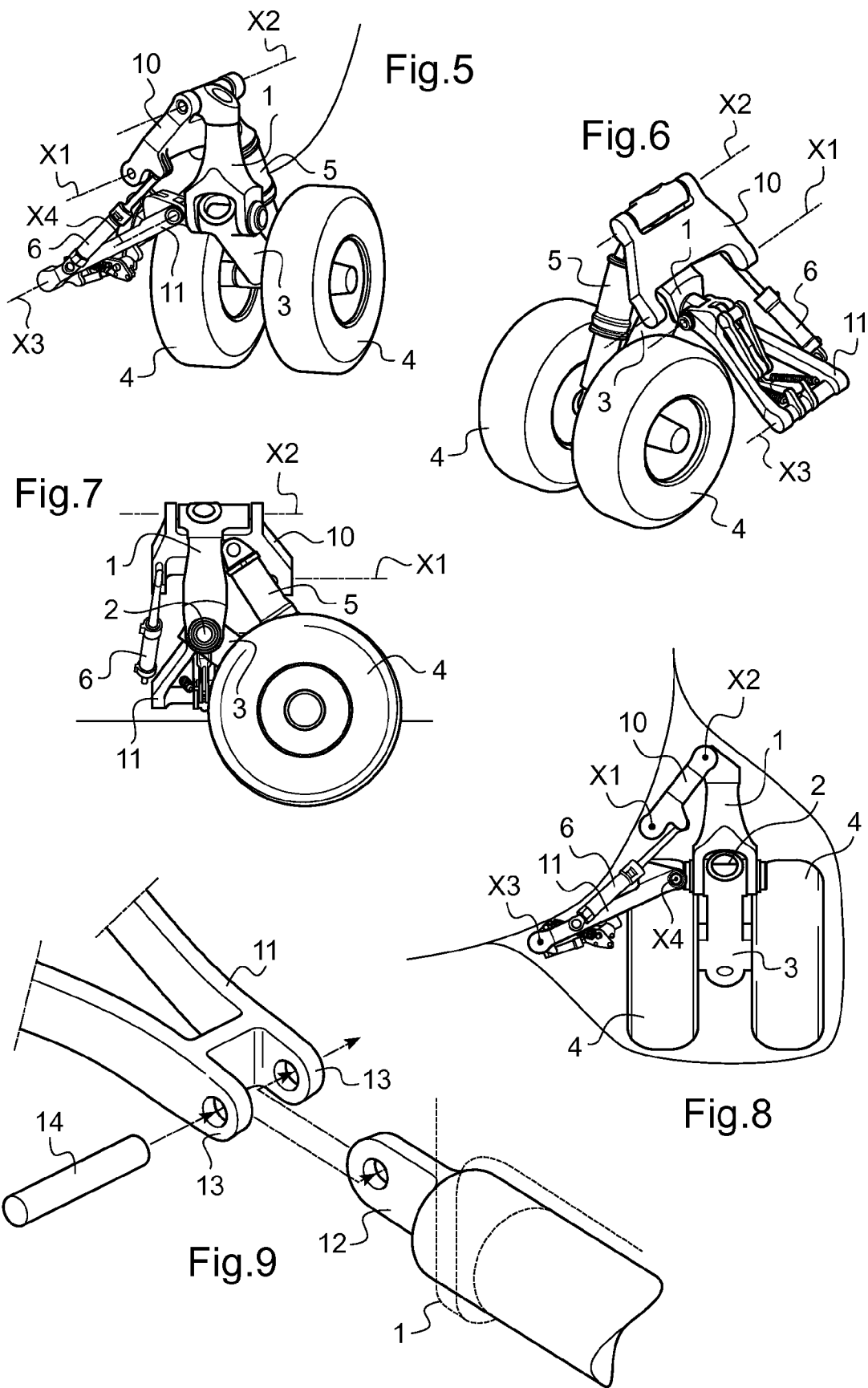

AIRCRAFT LANDING GEAR OF THE ROCKER-ARM AND DEFORMABLE-PARALLELOGRAM TYPE

The invention relates to aircraft landing gear of the rocker arm and deformable-parallelogram type.

TECHNOLOGICAL BACKGROUND OF THE INVENTION

Numerous amphibious aircraft are provided with deformable parallelogram landing gear. The term deformable parallelogram is used for a deformable structure with four parallel articulations even though, in practice, pairs of sides of the structure are very often not of identical length.

Examples are aircraft such as the Grumman Widgeon or the Grumman Goose. The latter includes two panels hinged on the aircraft structure about parallel first axes, a casing being hinged to each of the panels about second axes parallel to the first axes. The casing carries a wheel at its lower end. The assembly may be retracted in the manner of a deformable parallelogram, the wheel remaining parallel to itself during retraction.

The Boeing C17 military transport aircraft is also equipped with main landing gear of the deformable-parallelogram type. In such landing gear, the casing receives a pivot with a substantially vertical pivot axis, the pivot receiving at its bottom part a rocker arm carrying the wheels and at its top part the damper connected to the rocker arm. A linkage enables the pivot, and thus the rocker arm, the damper and the wheels, to be turned during retraction or deployment of the landing gear.

OBJECT OF THE INVENTION

The object of the invention is to provide very simple landing gear of the deformable-parallelogram type.

BRIEF DESCRIPTION OF THE INVENTION

The invention relates to aircraft landing gear of deformable-parallelogram type, including:
a leg including a casing having a lower end on which a rocker arm carrying at least one wheel is hinged, a shock absorber being connected between the rocker arm and the casing;
two panels each hinged on the one hand on the structure of the aircraft and on the other hand on the leg, about parallel axes;
the whole forming a deformable hinged structure. According to the invention, one of the panels is hinged on the leg whilst being connected to the casing by a pin on one end of a pivot of the rocker arm.

Accordingly, hinging said panel and the casing necessitates no complex shape of the casing and notably no yoke cantilevered laterally from the casing, which simplifies the design of the casing.

BRIEF DESCRIPTION OF THE FIGURES

The invention will be better understood in the light of the following description of one particular nonlimiting embodiment of the invention with reference to the appended figures, in which:

FIGS. 5 to 8 are a front perspective view, a rear perspective view, a side view and a front view of landing gear of the invention in a retracted position;

FIG. 9 is a detail view of the connection between the lower panel and the pivot of the rocker arm of the landing gear from FIGS. 1 to 8.

Referring to FIGS. 1 to 4, the landing gear of the invention includes a leg comprising a casing 1 the bottom end of which forms a fork with two wings in the form of a yoke to receive a pivot 2 on which a rocker arm 3 carrying wheels 4 is hinged. A damper 5 is connected between the casing 1 and the rocker arm 3.

The leg is hinged to the fuselage of the aircraft by means of an articulated and deformable structure to enable movement of the landing gear between the deployed position of FIGS. 1 to 4 and the retracted position of FIGS. 5 to 8. This hinged structure comprises:

an upper panel 10 that is hinged on the one hand to the structure of the aircraft about an axis X1 and on the other hand to the top part of the leg about an axis X2 parallel to the axis X1;

a lower panel 11 that is hinged on the one hand to the structure of the aircraft about an axis X3 parallel to the axes X1 and X2 and on the other hand to the lower part of the leg about an axis X4 parallel to the axis X1.

Figure 1:
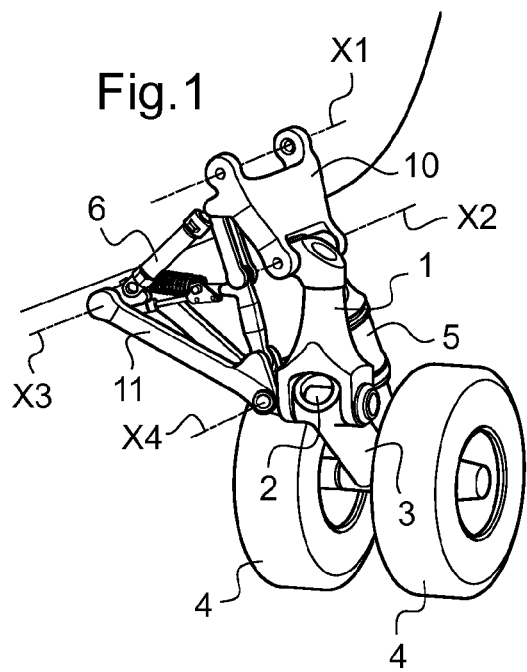
FIGS. 1 to 4 are a front perspective view, a rear perspective view, a side view and a front view of landing gear of the invention in a deployed position.
Figure 2:
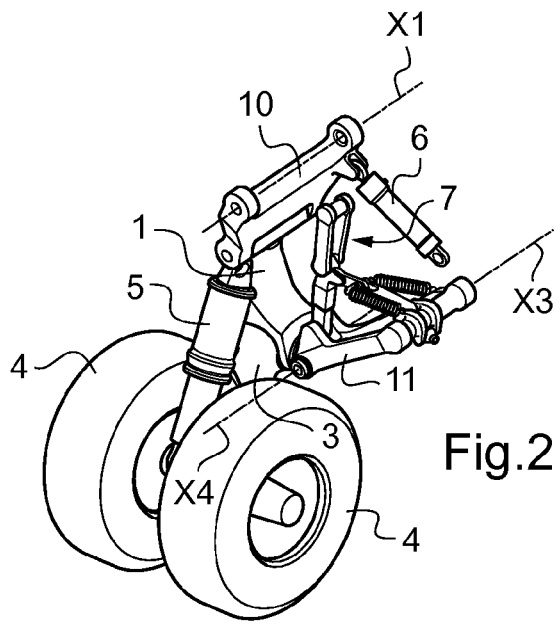
Figure 3:
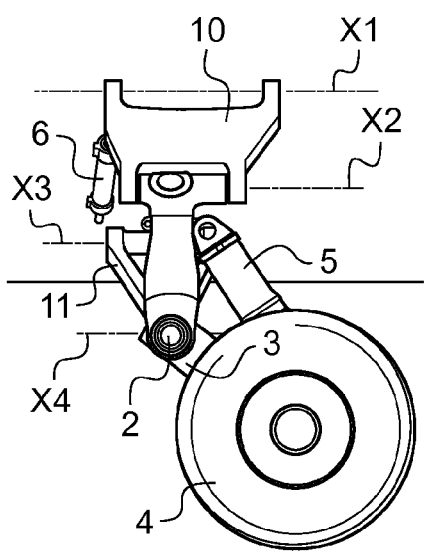
Figure 4:
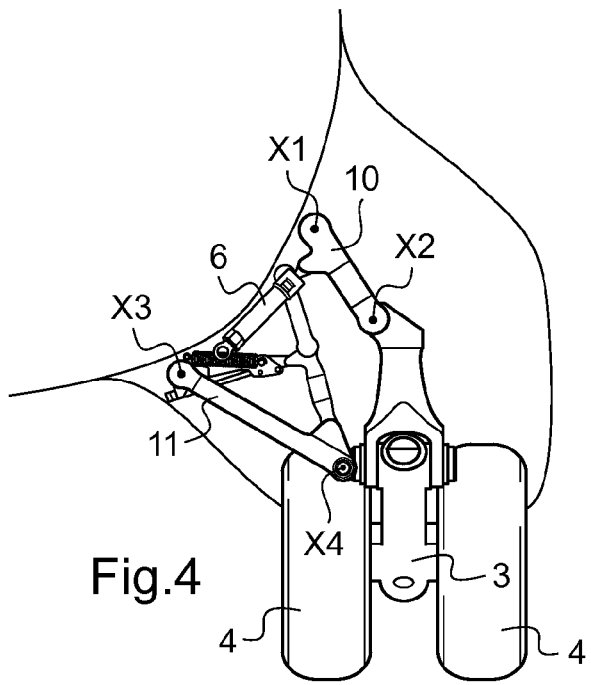

The assembly formed of the leg and the two panels forms a structure of deformable-parallelogram type that may be deformed at will between the deployed position of FIG. 1 and the retracted position of FIG. 4. To this end, a maneuvering member 6 (here a hydraulic ram) is coupled between the upper panel 10 and the lower panel 11 to cause these deformations of the landing gear (here, for greater clarity, the connection between the maneuvering member 6 and the lower panel 11 has not been shown, but it is obvious that the maneuvering member 6 is hinged to the lower panel).

A bracing member, here a strut 7 also connected between the two panels, enables stabilization of the landing gear in the deployed position. A locking member 8 connected between the lower panel 11 and the strut 7 locks the strut in the aligned position when the landing gear is in the deployed position. It will be noted that the only mechanical interfaces of the landing gear with the structure of the aircraft are the articulations of the panels 10, 11 about the axes X1 and X3.

Alternatively, if the configuration of the landing gear does not provide enough room to accommodate the maneuvering member and/or the bracing member between the panels as here, the maneuvering member and/or the bracing member could be connected between one of the panels and the structure of the aircraft. However, this disposition creates new interfaces with the structure of the aircraft.

Here, the upper panel 10 is hinged directly to the casing. On the other hand, and according to the invention, the lower panel 11 is not hinged to the casing 1 itself, but to one end 12 of the pivot 2 that projects laterally from the casing 1, as seen more particularly in FIG. 9. Here this end is conformed as a yoke that is inserted between the two wings 13 at the end of the lower panel 11, a pin 14 disposed in the wings and the yoke defining the articulation of the lower panel and the leg.

This disposition makes it possible to avoid machining one or more wings on the casing forming yokes to receive the hinge pin of the lower panel. What is more, the connection formed in this way has the function of preventing rotation of the pivot 2 relative to the casing 1.

The invention is not limited to what has just been described and to the contrary encompasses any variant falling within the scope of the invention as defined by the claims.

In particular, a ball joint could be disposed between the pin and the yoke on the end of the pivot. The end of the pivot could equally be conformed to include two wings, the lower panel then including a terminal yoke that is inserted between the two wings, although this disposition is a priori less advantageous.

The invention claimed is:

1. An aircraft landing gear of deformable-parallelogram type, comprising:
    a leg, including a casing (1), having a lower end on which a rocker arm (3) carrying at least one wheel is hinged by means of a pivot (2), a shock absorber (5) being connected between the rocker arm and the casing;
    two panels (10, 11), each hinged at a first portion on a structure of the aircraft and at a second portion on the leg, about parallel axes;
    wherein one of the panels (11) is hinged on the leg whilst being connected to the casing by a pin on one end of the pivot (2) of the rocker arm.

2. The aircraft landing gear as claimed in claim 1, including a bracing member that is connected to the two panels.

3. The aircraft landing gear as claimed in claim 1, including a maneuvering member (6) that is connected to the two panels.

\* \* \* \* \*